Figure 1:
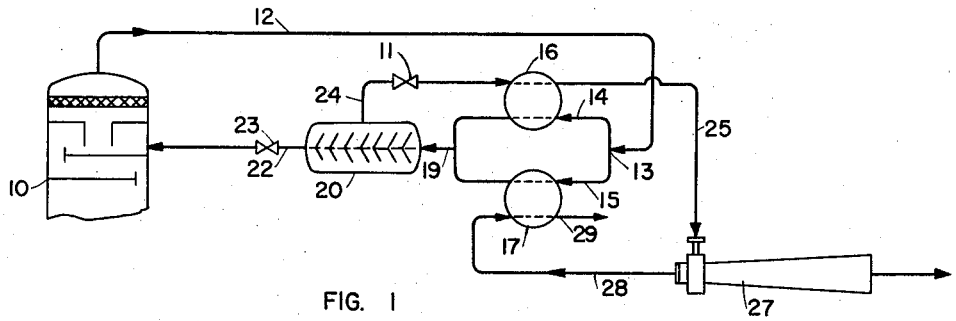

July 14, 1959     W. U. AUER ET AL     2,894,371
PREVENTING CONDENSATION INSIDE A VORTEX TUBE
Filed June 25, 1957

INVENTORS:
WILLEM ULRICH AUER
HENDRIK GROOTHUIS
WILLEM PIETER HENDAL
JACOBUS VINK

BY: John H. Colen
THEIR ATTORNEY

United States Patent Office 2,894,371
Patented July 14, 1959

2,894,371
PREVENTING CONDENSATION INSIDE A VORTEX TUBE

Willem Ulrich Auer, Hendrik Groothuis, Willem Pieter Hendal, and Jacobus Vink, Amsterdam, Netherlands, assignors to Shell Development Company, New York, N.Y., a corporation of Delaware Application June 25, 1957, Serial No. 667,875

Claims priority, application Netherlands October 17, 1956

13 Claims. (Cl. 62—5)

This invention relates to an improved process and apparatus for the separation of a gaseous mixture by cooling and condensation utilizing a vortex tube for cooling purposes, and more particularly provides an improved method and system which forestalls the formation of condensation inside the vortex tube, thereby increasing its efficiency and the amount of cooling afforded by the tube.

It is advantageous in many industrial processes to be able to fractionate low boiling gaseous mixtures to recover valuable components. Various schemes have been proposed for this purpose. For example, in order to lessen the loss of ethylene in the demethanizer top gas of an ethylene unit, it has been suggested before that a vortex tube could be used to provide refrigeration for the cooling of the top gas to effect a condensation of the ethylene therefrom. A vortex tube may be readily employed in this situation since the top gas leaves the demethanizer column at an extremely high pressure. In such a system, the top gas upon being cooled goes to a liquid-vapor separator wherein the condensate containing an appreciable amount of ethylene is separated. The vapor from the separator passes to the vortex tube where a major portion of it is cooled and then returned to provide the aforementioned refrigeration for the demethanizer top gas. This arrangement has supplied a method for lessening the amount of ethylene previously lost. However, the vortex tube has not operated as efficiently as desired.

The vortex tube that has been used in this separation process may be of the type shown in U.S. 1,952,281 to G. J. Ranque. The vortex tube functions to separate the gas fed to it into a relatively high temperature stream and a low temperature stream. The vortex tube has a chamber with the shape of a surface of revolution, usually a cylinder. The tube is provided with an inlet pipe for tangentially introducing the feed gas into a central region of the chamber wherein there results a high velocity vortex-type flow of the gas along the axis of the tube. Since the inner portion of the gas is doing thermodynamic work on the outlying peripheral gas, strong radial and longitudinal temperature gradients are developed making it possible to take off at one end of the tube a low pressure gas substantially colder than inlet gas and at the other end of the tube a stream of hot gas, considerably warmer than the inlet gas. It is this cold stream from the vortex tube which is doubled back as mentioned before to heat exchange with the demethanizer top gas.

It has developed that where the vapor or gas is passed directly to the vortex tube from the liquid-vapor separator, condensation frequently forms in the tube. The condensation has a decelerating effect on the gases passing therethrough, thus cutting the efficiency of the tube as a refrigeration source. It is believed that in time the condensation is responsible for erosion of the tube.

It is an object of this invention to provide a system and process utilizing a vortex tube for increasing the percentage recovery of ethylene or other low boiling material from a gaseous mixture containing the material along with other low boiling components.

It is a further object of this invention to provide means for forestalling the formation of any appreciable amount of condensation in the vortex tube. Various other objects will become apparent from the reading of the following description of the invention, which will be made with reference to the accompanying drawing, wherein:

Fig. 1 is a schematic flow diagram of one embodiment of the system of the invention where there is employed two separate heat exchangers with one of the heat exchangers being cooled by returned vapors from a vortex tube, and the other heat exchanger being cooled by the same vapors prior to their passage to the vortex tube and immediately after their separation in a liquid-vapor separator.

Figure 2:
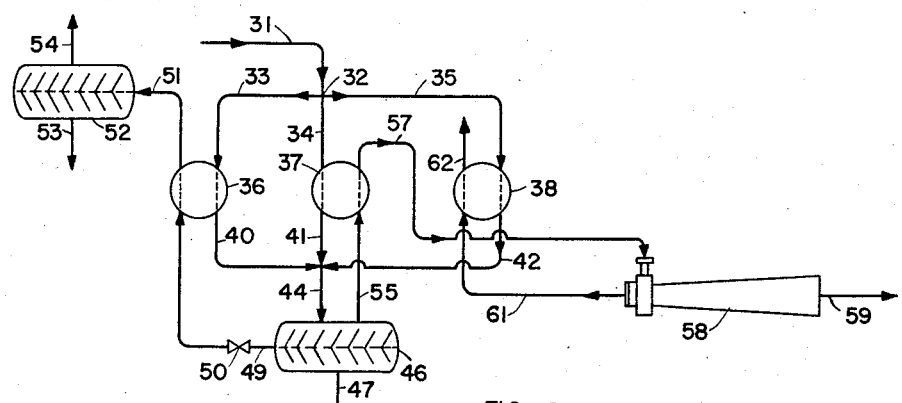
Figure 3:
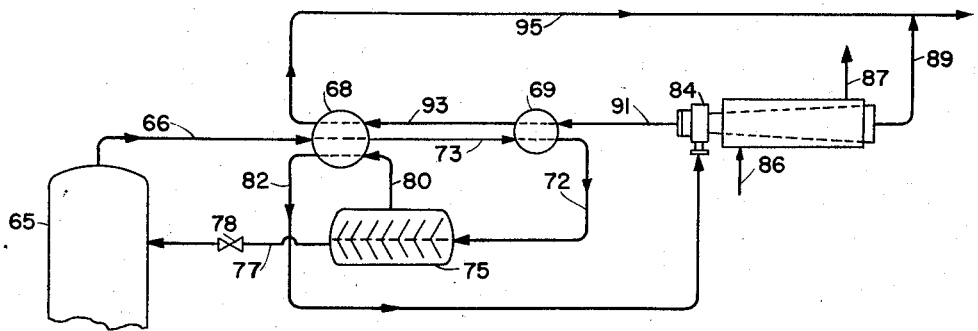

Fig. 2 is a diagram of a system employing three heat exchangers for cooling the gaseous stream, two of the heat exchangers being cooled as in the system of Fig. 1 with the third heat exchanger being cooled by an expanded condensate from the liquid-vapor separator, and Fig. 3 is a diagram of a system which utilizes a double heat exchanger which has for its coolants the two coolants that are separately used in the system of Fig. 1.

The efficiency of the separation system and process outlined above may be appreciably enhanced if the spread between the dew point temperature and the actual temperature of the vapor phase is increased (prior to its admission to the vortex tube) to a degree that forestalls any appreciable condensation within the tube. Heretofore, the vapor from the separator was introduced directly to the vortex tube without a change in temperature and it accordingly had a temperature at approximately the dew point of that vapor. Since the temperature of the vapor was at or near its dew point, condensation to some extent readily occurred in the vortex tube with the cooling of that vapor. According to a preferred embodiment of the present invention, the vapor from the liquid-vapor separator (prior to its cooling in the vortex tube) is passed in heat exchange relationship with at least a portion of the gaseous stream being fractionated. This heat exchange raises the temperature of the vapor appreciably above its dew point. Such an arrangement generally ensures that no significant amount of condensation occurs during the circulation of the vapor phase through the vortex tube. The maximum temperature to which the vapors can be raised is limited by the temperature and composition of the incoming gaseous stream against which the vapors are heat exchanged and for this reason, it has been found necessary in some instances to subject the vapor to a throttling operation, in order to obtain a sufficiently low dew point.

In one embodiment of the improved process for the separation of low boiling vapor substances from a stream of such substances, the stream is divided into two portions A and B which are passed through cooling zones A and B respectively. The portions A and B from their respective cooling zones are introduced as a combined stream into a separation zone wherein the stream is divided into a condensate phase and a vapor phase. The vapor phase is withdrawn from the separation zone and circulated through the cooling zone A as a coolant for that zone. The heat exchange occurring in zone A raises the heat content of the vapor phase coolant to a point that generally ensures that no appreciable amount of condensation will occur during the subsequent passage of that phase through a vortex tube. From cooling zone A, the vapor phase coolant goes to a vortex tube wherein at least a portion of the vapor is substantially reduced in temperature, from whence it is discharged as a cooled vapor stream. The cooled vapor is circulated from the vortex tube to the zone B as a coolant for that zone.

In another embodiment of the improved process of the invention the gaseous stream is simultaneously cooled by both the vapor phase directly from the separation zone and by the returned cooled vapors from the vortex tube. This may be accomplished through the use of a single double heat exchanger.

As seen in the drawings, there are several possible systems for practicing the process of the invention. The superheating of the separator vapor or gas may be accomplished by passing it in heat exchange with a portion or all of the gaseous stream being fractionated. In one system, the stream is divided between two heat exchangers, one of which is cooled by the vapor direct from the liquid-vapor separator. The other heat exchanger has as its coolant the cooled stream of gas from the vortex tube. In other installations, it may be preferred to utilize a heat exchanger in which the gaseous stream being treated is simultaneously cooled by the two above-mentioned gas coolants. Either of these arrangements will generally superheat the gas from the separator to a temperature which ensures that no significant condensation will occur when that vapor is admitted as the feed to the vortex tube.

With reference to the system illustrated in Fig. 1, top gases from a demethanizer 10 are passed through a conduit 12 to a junction 13 of two lines 14 and 15. There the stream divides, with a portion being led by the line 14 to a heat exchanger 16. The other portion of the gaseous stream is directed by the line 15 to a second heat exchanger 17. The divided gaseous streams from the two heat exchangers combine and pass through a pipe 19 to a liquid-vapor separator 20. The separator may be any of various conventional types such as a wire mesh demister or a cyclone vortex chamber. The condensate gathers in the bottom of the separator and is transferred in the system illustrated by a line 22 through a valve 23 to the demethanizer where the condensate serves as a reflux. The vapors from the head space of the separator 20 move by a line 24 to the previously mentioned heat exchanger 16. Here the vapors cool the incoming gaseous stream to some extent and simultaneously the temperature of the vapor phase is increased. The vapors out of the heat exchanger go by a conduit 25 to a vortex tube 27. Here the vapor phase is divided into a relatively cold stream and a relatively hot stream. The cooled stream of vapors from the vortex tube leaves by a line 28 which connects to the heat exchanger 17. The cooled vapor stream from the vortex tube serves as the coolant for this second heat exchanger. The cold stream of vapors is discharged from the heat exchanger through a line 29. This arrangement whereby the vapor from the liquid-vapor separator is passed in heat exchange relationship with the incoming gaseous stream has been found to be effective in forestalling condensation which formerly occurred in the vortex tube.

In the system of Fig. 2 the top gas from a demethanizer or other source of low boiling substances passes by a line 31 to a junction 32 where the line divides into three branches 33, 34 and 35. Branch 33 conducts a portion of the incoming gaseous stream to a first heat exchanger 36, the line 34 takes another portion of the stream to a second heat exchanger 37, and the third branch 35 leads the remainder of the gaseous stream to a third heat exchanger 38. The cooled gases from the three heat exchangers pass by lines 40, 41 and 42 to a single conduit 44 which couples into a liquid-vapor separator 46 of the general type described before. The condensate of the separator may be evacuated through either a line 47, through which the condensate may be returned as reflux or passed to product storage or through a line 49. The latter line has disposed within it a throttling valve 50. By suitable settings of the throttling valve all or a portion of the condensate may be expanded and depending upon the conditions, all or a portion of the expanded condensate may be vaporized. The expanded condensate, which may or may not contain liquid, passes through the line 49 to the earlier mentioned heat exchanger 36. The expanded condensate serves as the coolant for that heat exchanger leaving the heat exchanger by a line 51 which connects into a second liquid-vapor separator 52 which may resemble in structure the other separator 46. Here any condensate present is separated out and may be removed from the separator by a line 53. The vapor leaves the head space of this latter separator through a line 54. If the exiting vapor should have a valuable component, it may be compressed in a compressor. If the condensate collected in the first separator 46 consists of more than one component, the expansion may be conducted so that the most volatile component or components vaporize, leaving the least volatile component or components in a liquid form. The resulting vapor-liquid mixture which passes through line 49 to the heat exchanger 36 and from there through line 51 to the second separator 52 may then be split into vapor and the desired liquid. By this arrangement, the original condensate of separator 46 may be fractionated.

The vapor from a separator 46 is transferred through a line 55 to the heat exchanger 37 where it is passed in heat exchange relationship with the incoming gaseous stream. In this heat exchanger, as in the other, the coolant is passed countercurrent to the gaseous stream. The temperature of the vapor is somewhat elevated during the movement of the vapor through this latter heat exchanger, thus preparing the vapor for introduction through a line 57 to a vortex tube 58. The increasing of the heat content of the vapor by passage through the heat exchanger 37 forestalls any significant condensation of that vapor in its subsequent passage through the vortex tube. A hot gas stream leaves the vortex tube 58 through a conduit 59 and a cooled vapor stream is transferred from the vortex tube through a line 61 to the heat exchanger 38 wherein it serves as a coolant, leaving through a line 62.

If desired, a throttling valve 11 may be placed in line 24 of the system of Fig. 1 or in the comparable line 55 of the system of Fig. 2. Each of these lines, it will be noted, connects the head space of its respective liquid-vapor separator to its respective heat exchanger. The throttling valve so placed may be used to reduce the temperature of the gases from the separators before these gases are introduced into the heat exchanger.

In some installations, it may be necessary to use a throttling valve between the liquid-vapor separator and the vortex tube to impart a sufficiently low dew point to the vapors or gases (from the separator) for the vortex tube to obtain maximum efficiency. As an alternative, a gas engine may be employed rather than the throttling valve.

The system of Fig. 3 is coupled to a demethanizer 65 through a line 66 which removes the top gases therefrom and passes them in succession through a double heat exchanger 68 and a single heat exchanger 69 to a line 72 which empties into an accumulator or liquid-vapor separator 75. A conduit 73 passes the top gas from the double heat exchanger to the single exchanger. The double heat exchanger 68 may have three concentrically disposed zones including a first zone that is centrally placed to form the core of the heat exchanger, and a second zone which has an annular cross section defined by an outer cylindrical wall and an inner cylindrical wall. The inner wall of this second zone is in heat exchange relationship with the aforementioned first zone. The third zone of this heat exchanger, likewise, has an annular cross section contained between an outer cylindrical wall and an inner cylindrical wall. In this instance, the inner cylindrical wall of the third zone is in heat exchange relationship with the second zone. The incoming gaseous stream passes through the intermediate zone, i.e. the second zone.

The condensate collected in the separator 75 is removed through a line 77 and a valve 78 disposed therein to the demethanizer. Here the returned condensate serves as a reflux. The vapors from the head space of the separator leave by a line 80 which passes through the outer third zone of the double heat exchanger 68. From there the heated vapors move through a pipe 82 to the inlet of a jacketed vortex tube 84. The coolant for the tube enters through a line 86, circulates through the jacket and leaves by a line 87. By cooling the vortex tube, the size of the hot stream leaving through line 89 is substantially reduced. The cooled vapors go by a conduit 91 to the previous mentioned heat exchanger 69 where they serve as the coolant for the gaseous stream passing therethrough. The cooled vapors from the vortex tube, somewhat raised in temperature by their passage through the exchanger 69, then go by a line 93 to the first zone, that is, the centrally disposed zone, of the double heat exchanger 68. From the latter heat exchanger the vortex cooled vapors are transferred through a line 95 to a junction with the gases of the hot stream from the vortex tube.

In the instance where the gaseous stream being fractionated is divided between two or three heat exchangers as in Figs. 1 and 2, the temperature of the recombined stream out of two or three heat exchangers (prior to introduction to the subsequent liquid-vapor separator) may be regulated by controlling the ratio of the quantities of the gaseous stream flowing through the respective heat exchangers. As a general rule, the temperature of the portion of the gaseous stream passing from heat exchanger 17 of system 1 will be appreciably lower than the temperature of the portion of the gaseous stream exiting out of heat exchanger 16, which latter heat exchanger has as its coolant, the vapors from the liquid-vapor separator 20.

The process of the invention may be applied to many kinds of gaseous mixtures. The process is particularly adaptable to the separation of light hydrocarbons from a stream made up of low boiling constituents. For example, the process has been found to be particularly adaptable to the recovery of ethylene from a mixture containing ethylene, methane, nitrogen and hydrogen. The improved process may form a part of a distillation or absorption process and the condensate may be used as a reflux for the distillation column. The system may be coupled to a demethanizer of a distillation column of an ethylene recovery unit of the type illustrated and described in the September 1952 issue of the Petroleum Refiner, pages 250–251.

The following examples are illustrative of the usefulness of the process:

*Example I*

A mixture of hydrocarbons (methane, ethylene, ethane, and higher hydrocarbons), hydrogen and nitrogen was distilled in a distillation column. The top gases passing overhead contained a quantity of valuable ethylene. The total composition of the overhead gases was 53.8 mol percent of nitrogen plus hydrogen, 38.7 mol percent of methane, and 7.5 mol percent of ethylene. The rate of flow of the overhead gases per hour was 317.5K mol. The pressure of the overhead gas was 39 atmospheres absolute and its temperature $-90°$ C.

The system used for the separation of the ethylene in this example is substantially that illustrated in Fig. 1. The vortex tube in this instance was externally cooled with liquid ethylene having a temperature of $-101°$ C. The quantity of condensate collected in the separator 20 was 37.1K mol per hour. The composition of the condensate was 53.8 mol percent of methane, and 46.2 mol percent of ethylene. The temperature of the condensate was $-109.5°$ C. The recovery of ethylene was 72% of that present in the gases passing overhead. In a system which did not employ the heat exchanger 16 (i.e. in a system where the vapor from the separator 20 was not superheated prior to introduction to the vortex tube) only approximately 60% of ethylene was recovered from the overhead gas.

The vapor or gases were collected in the head space of the separator 20 at the rate of 280K mol per hour. The gases were expanded in the vortex tube 27 to a pressure of 4.4 atmospheres absolute. The cooled gas stream from the vortex tube had a temperature of $-132°$ C. The gaseous stream from the distillation column 10 was divided between the heat exchanger 17 and 16 in a proportion of 204.8K mol per hour and 112.7K mol per hour, respectively. The gas or vapor from the separator 20 was superheated from $-109.5°$ C. to $-91°$ C. in the heat exchanger 16. The cold gas from the vortex tube was heated from $-132°$ C. to $-91°$ C. in the other heat exchanger.

*Example II*

The treated gaseous mixture of this example consisted of 32 mol percent of hydrogen plus nitrogen, 64 mol percent of methane and 4 mol percent of ethylene. The gaseous stream of the mixture had a pressure of 39 atmospheres absolute and a temperature of $-90°$ C. It was processed in a system similar to that shown in Fig. 2 except that in this instance since there was complete vaporization of the expanded part of the condensate of separator 46, there was no need to use the second separator 53. The vapor of the expanded condensate was subsequently compressed by a compressor. The gaseous stream flowing through the line 31 was divided among the heat exchangers 37, 38 and 36 in the respective quantities of 25 mol percent, 34 mol percent and 41 mol percent. The condensate collected in separator 46 amounted to 25 mol percent of the entering stream and the overhead vapor of the separator constituted the remaining 75 mol percent. The temperature in the separator was $-107°$ C. The composition of the condensate and the overhead gases of the separator calculated on the starting mixture, was as follows:

Condensate:
  21.5 mol percent of methane
  3.5 mol percent of ethylene
Gases:
  32 mol percent of hydrogen plus nitrogen
  42.5 mol percent of methane
  0.5 mol percent of ethylene The amount of ethylene recovered in the condensate is 87.5% of that present in the original gaseous stream.

The gases from the head space of the separator 46 were superheated in the heat exchanger 37 to nearly the original temperature of the incoming gaseous stream (i.e. gaseous mixture being fractionated), namely, $-91°$ C. The vortex tube was here cooled with liquid ethylene at a temperature of $-101°$ C. Twenty percent of the entering gases to the vortex tube were drawn off as relatively hot gases and the remaining 80% by volume as cold gases.

Fifty-six mol percent of the condensate was withdrawn as a liquid through line 47. The remaining 44 mol percent condensate was expanded to 6.3 atmospheres absolute and led through heat exchanger 36. As mentioned above, the vapor of the expanded condensate was subsequently compressed.

*Example III*

The process of this example is the same as that described in Example II above and was carried out with a different distribution of the incoming gaseous stream through the three heat exchangers. The distribution was 17 mol percent in heat exchanger 37, 18 mol percent in heat exchanger 38 and 65 mol percent in heat exchanger 36. The gaseous stream on condensation divided 39 mol percent as condensate and 61 mol percent as the gases in the head space of the separator. The temperature in the separator was —112° C.

The composition of the condensate and gases, calculated on the entering gaseous stream was as follows:

Condensate:
    35.2 mol percent methane
    3.8 mol percent of ethylene

Gases:
    32 mol percent of hydrogen plus nitrogen
    28.8 mol percent of methane
    0.2 mol percent of ethylene The yield of the ethylene recovered was 95% of that in the entering stream. In this instance 35.6 mol percent of the condensate was drawn off as a liquid through line 47 and the remaining 64.4 mol percent was expanded to 6.3 atmospheres absolute and passed through the heat exchanger 36 in the form of a vapor. Here, as in the preceding example, the vapor was subsequently compressed by a compressor.

We claim as our invention:

1. In a process for the separation of a fraction from a gaseous stream by cooling the stream to produce a condensate and a vapor phase and wherein a vortex tube is utilized to cool a portion of the vapor phase and which cooled vapor phase is circulated as a coolant for the aforementioned cooling of said stream, the improvement which comprises increasing the spread between the dew point temperature and the actual temperature of the vapor phase prior to its introduction to the vortex tube to a magnitude that forestalls any appreciable condensation within the tube, thereby significantly increasing the recovery of the condensate over that experienced with the occurrence of condensation within the tube.

2. In a process for the separation of a fraction from a gaseous stream by cooling the stream to produce a condensate and a vapor phase and wherein a vortex tube is utilized to cool at least a portion of the vapor phase and which cooled vapor phase is circulated as a coolant for the aforementioned cooling of said stream, the improvement which comprises passing the vapor phase prior to its cooling in the vortex tube in heat exchange relationship with at least a portion of the stream and during the passage raising the temperature of the vapor phase, and thereby avoiding impairment of the efficiency of the tube attributable to condensation formation therein and consequent deceleration of the gases passing therethrough.

3. A process in accordance with claim 2 wherein the vapor phase is subjected to a throttling action before its introduction to the vortex tube.

4. In a cooling and condensation process for the treatment of a gaseous stream of low boiling substances to obtain a condensate and a vapor phase and wherein a vortex tube is employed to cool at least a portion of the vapor phase, the improvement comprising passing the stream through a cooling zone wherein it is in heat exchange relationship with both the vapor phase prior to its cooling in the vortex tube and the cooled vapors from said vortex tube.

5. An improved process for the separation of low boiling vapor substances from a stream of said substances, which comprises dividing the stream into at least two portions A and B and passing said portions through cooling zones A and B respectively, separating the cooled low boiling substances exiting from the zones into a vapor phase and a condensate phase, withdrawing the vapor phase and circulating it through zone A as the coolant for said zone and therein superheating the vapor phase to a temperature that forestalls significant condensation therefrom in the subsequent passage of the vapor through a vortex tube, passing the vapor from this cooling zone A to the vortex tube to effect a substantial cooling of at least a portion of said vapor, and circulating the cooled vapor from the vortex tube to the zone B as the coolant for that zone.

6. A process for the separation of a gaseous stream made up principally of low boiling substances comprising cooling the gaseous stream to obtain a condensate and a gas phase, separating the condensate phase from the gas phase, circulating the gas phase in heat exchange relationship with at least a portion of said stream at a place preceding the separation of said stream into its two phases to assist in the aforementioned cooling, transferring the gas phase from this cooling operation wherein superheating of the gas phase occurred to a vortex tube wherein at least a major portion of said gas phase is cooled, and circulating the cooled gas phase to assist in the aforementioned cooling of the gaseous stream.

7. A process as described in claim 6, wherein the gaseous stream contains ethylene as a valuable component with a major portion of the ethylene being recovered in the condensate phase.

8. In a process for the separation of low boiling vapor substances from a stream of such substances, the improvement which comprises dividing the stream into at least two portions A and B and passing said portions to cooling zones A and B respectively, combining portions A and B from their respective cooling zones and introducing the combined stream into a separation zone wherein the stream is divided into a condensate phase and a vapor phase, withdrawing the vapor phase from the separation zone and circulating it through said cooling zone A as a coolant for that zone and during said circulation raising the temperature of the vapor phase to a point significantly above the dew point temperature of said vapor phase, conducting the vapor phase from zone A to the vortex tube wherein at least a portion of the vapor phase is substantially reduced in temperature, and circulating the cooled vapor to zone B as a coolant for that zone.

9. A process as in claim 8 wherein the vapor phase is subjected to a throttling action between the separation zone and the vortex tube.

10. An improved process for the separation of low boiling vaporous substances from a stream of said substances which comprises dividing the stream of low boiling substances into at least three portions A, B, and C and passing said portions through cooling zones A, B, and C, respectively, recombining the stream following cooling and separating into a condensate phase and a vapor phase, circulating the vapor phase through zone A as a coolant for said zone and during said circulation raising the temperature of the vapor phase to a point ensuring that the vapor will possess sufficient heat to forestall appreciable condensation therefrom in subsequent passage through a vortex tube, passing the vapor phase from the cooling zone A to the vortex tube and therein bringing about a substantial cooling of at least a portion of said vapor, circulating the cooled vapor to zone B as a coolant, expanding at least a portion of said condensate phase to form a condensate vapor by lowering the pressure thereon and circulating the condensate vapor through zone C as a coolant for said zone.

11. A system for the separation of a fraction from a stream of low boiling substances which comprises a first heat exchanger, a second exchanger, means for dividing the stream and for introducing the divided stream to the two heat exchangers, a liquid-vapor separator having a vapor space and a condensate space, means for combining the stream from the two heat exchangers and for introducing the combined stream to said liquid-vapor separator, a vortex tube having an inlet for incoming feed vapor and an outlet for cooled vapor, a conduit connecting the vapor space of the separator to the first heat exchanger, a second conduit leading from the first heat exchanger to the inlet of said vortex tube, a third conduit connected to the outlet of the vortex tube and leading to the second heat exchanger to provide cooled vapor from the vortex tube as coolant for said second heat exchanger.

12. A system for the separation of a fraction from a stream of low boiling substances which comprises a heat exchanger having three concentrically disposed zones including a first zone that is centrally placed to form the core of the heat exchanger, a second zone having an annular cross section with an outer wall and an inner wall whose inner wall is in heat exchange relationship with the first zone, and a third zone having an annular cross section and an inner wall which inner wall is in heat exchange relationship with the second zone, means for introducing the stream into the second zone, a liquid-vapor separator having a vapor space and a condensate space, a conduit connecting the second zone of the heat exchanger with said separator, a conduit connecting the vapor space of the separator to the third zone of the heat exchanger, a vortex tube having an inlet for incoming feed vapors and an outlet for cooled vapors, a conduit connecting the third zone of the heat exchanger with the inlet of the vortex tube, a conduit connecting the outlet of the vortex tube with the first zone of said heat exchanger to provide vortex cooled vapors as a coolant for the stream.

13. A system for the separation of a fraction from a stream of low boiling substances which comprises a heat exchanging means for cooling said stream to form a vapor and a liquid, a separation means associated with the latter means to divide the cooled stream into a vapor phase and a condensate phase, a vortex tube having an inlet for incoming feed vapors and an outlet for cooled vapors, a conduit connecting the vapor space of the separating means with said heat exchanging means to provide vapor as coolant therefor, a conduit leading from the heat exchanging means to the inlet of the vortex tube, and another conduit connecting the outlet of the vortex tube with the heat exchanging means to supply a passage for circulating the cooled vapors to the heat exchanging means as a second coolant.

References Cited in the file of this patent

UNITED STATES PATENTS

| | | |
|---|---|---|
| 2,265,558 | Ward | Dec. 9, 1941 |
| 2,522,787 | Hughes | Sept. 19, 1950 |
| 2,824,428 | Yendall | Feb. 25, 1958 |